United States Patent [19]

Ambrose

[11] Patent Number: 5,133,134
[45] Date of Patent: Jul. 28, 1992

[54] APPARATUS AND METHOD FOR ON SITE TESTING OF INVOLUTE AXLE GEAR PARAMETERS

[76] Inventor: Wilfred G. Ambrose, 4527 W. Orangewood Ave., Glendale, Ariz. 85301

[21] Appl. No.: 597,436

[22] Filed: Oct. 15, 1990

Related U.S. Application Data

[63] Continuation-in-part of Ser. No. 338,541, Apr. 13, 1989, Pat. No. 4,962,590, which is a continuation of Ser. No. 87,225, Aug. 20, 1987, abandoned.

[51] Int. Cl.[5] .................. G01M 13/02; G01B 5/20
[52] U.S. Cl. .................. 33/501.11; 33/501.14; 33/501.18
[58] Field of Search ............ 33/501.7, 501.11, 501.14, 33/501.15, 501.17, 510.18

[56] References Cited

U.S. PATENT DOCUMENTS

| 1,567,134 | 12/1925 | Gosnell | 33/501.11 |
| 1,601,038 | 9/1926 | Orcutt | 33/501.17 |
| 1,753,014 | 4/1930 | Logue | 33/501.15 |
| 2,909,844 | 10/1959 | Wagner | 33/501.17 |
| 3,237,442 | 3/1966 | De Vos | 33/501.14 |
| 3,877,150 | 4/1975 | Hofler | 33/501.14 |
| 4,137,642 | 2/1979 | Halvarsson | 33/501.7 |

FOREIGN PATENT DOCUMENTS

| 0374586 | 11/1921 | Fed. Rep. of Germany ... | 33/501.14 |
| 0346805 | 1/1922 | Fed. Rep. of Germany ... | 33/501.15 |
| 0379854 | 8/1923 | Fed. Rep. of Germany ... | 33/501.15 |
| 1111367 | 2/1956 | France | 33/501.14 |
| 0548446 | 10/1942 | United Kingdom | 33/501.14 |
| 0746586 | 3/1956 | United Kingdom | 33/501.14 |

Primary Examiner—Thomas B. Will
Attorney, Agent, or Firm—William W. Holloway

[57] ABSTRACT

The apparatus for measuring the parameters of an axle gear includes an attachment mechanism for providing a surface parallel to the gear axis and positioned at a distance equal to the base circle radius from the gear axis. A displacement measuring device is positioned with the flat lower surface in contact with the attachment mechanism surface. Extending from the side of displacement measuring device is a probe, the probe positioned to be in the same plane as the flat lower surface and extending parallel to the axis of the gear. The probe of the displacement measuring device is placed in contact with a surface of a gear tooth and the displacement device is rotated without slipping on the attachment mechanism surface. When the displacement measuring device is rotated, the probe will be displaced only within preselected limits when in contact with a gear tooth surface between the top of the tooth and the root of the tooth for an acceptable gear. The displacement mechanism can include a projection for contacting a predefined surface of the attachment mechanism which will prevent slipping of the displacement measuring device on the attachment base circle radius during rotation. An extension can be coupled to the displacement measuring device to provide a second probe for block span measurements.

16 Claims, 2 Drawing Sheets

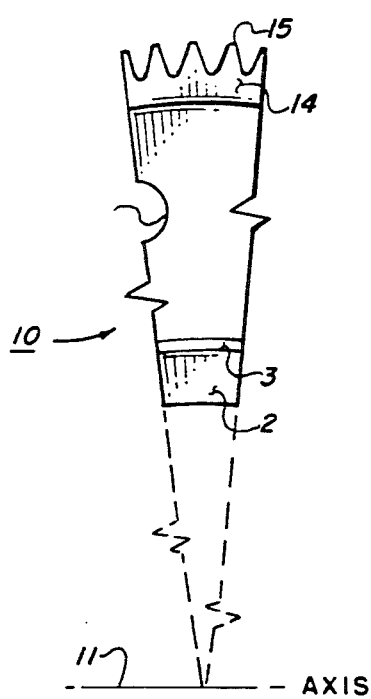
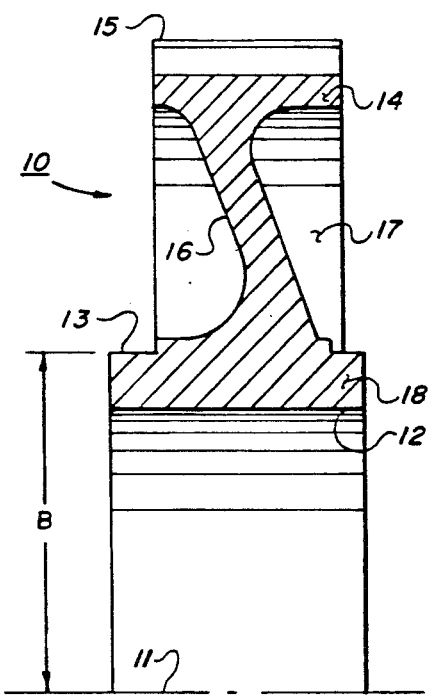
FIG. 1A.
FIG. 1B.
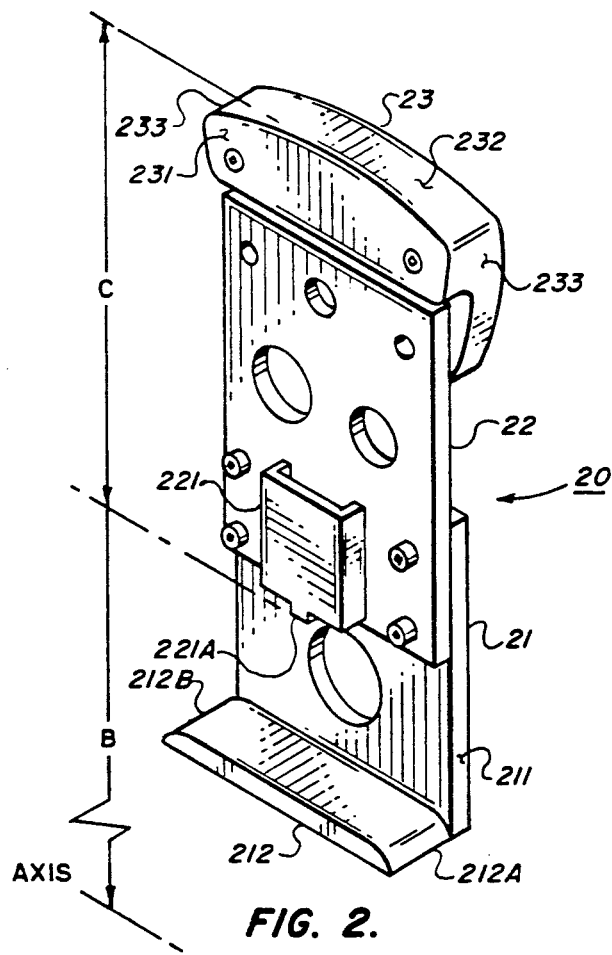
FIG. 2.

APPARATUS AND METHOD FOR ON SITE TESTING OF INVOLUTE AXLE GEAR PARAMETERS

This application is a continuation in part of U.S. Pat. application No. 07/338,541, filed on Apr. 13, 1989, now U.S. Pat. No. 4,962,590, issued Oct. 16, 1990, which U.S. Pat. application was a continuation of U.S. Pat. application No. 07/087,225, filed on Aug. 20, 1987, now abandoned.

BACKGROUND OF THE INVENTION

1. Field of the Invention

This invention relates generally to the measurement of the parameters of gears and, more particularly, to apparatus and procedures for verifying parameters of an involute axle gear. The apparatus of the present invention is adapted to be portable, permitting the axle gear parameters to be measured at remote locations.

2. Description of the Related Art

The use of gears to transfer rotational motion from one shaft to another shaft is well-known in modern industrial practice. One type of gear is the involute gear or pinion, a gear configuration that has been widely used in the railroad industry. The involute gear is especially desirable in those applications where the center of the gear or pinion can not be maintained with precision.

In the fabrication of the gear, maintaining of precise tolerances is essential. Otherwise, the gear or pinion can develop excessive wear and can be unsuitable for operation after an unacceptably short period of time. Furthermore, the size and operational position of the gears typically increase the difficulty in exchanging a defective gear for a suitable gear. Thus, the user of a gear or pinion will typically want to verify that the measurements of the gear parameters are within specified tolerances, even during routine maintenance. Similarly, it is frequently desirable to measure the gear or pinion after extended use. Unacceptable departures from the original profile can identify design problems in the apparatus utilizing the gear or pinion or defective workmanship or defective materials in the fabrication of the gear.

At present, complex automatic apparatus is available for testing and verifying the parameters of involute gears and pinions. The automatic apparatus involves the use of fulcrum points, linkage apparatus and ratio arms. While this apparatus provides acceptable testing and verification of the gear or pinion parameters, the apparatus is expensive and requires trained personnel for its operation. In addition, the testing apparatus of the prior art requires that the gear be brought to the site having the test apparatus.

Apparatus for testing the parameters of involute gears and pinions, which overcomes many of the problems of the prior art and the related art, has been described in U.S. Pat. No. 4,962,590. Disks are concentrically coupled to the gears and pinions to be tested, the disks having surfaces which have a radius from the axis of the gear equal to the base circle radius. The disks are rolled on tracks, the tracks having a displacement measuring probe for contacting the gear teeth in the plane of the tracks. The contact point is therefore positioned on a tangent line to the gear base circle when the disks (coupled to the gear) are rotated on the tracks. As explained in the referenced U.S. Patent, a correctly configured involute gear surface will pass through a fixed point on a line tangent to the base circle when the disks coupled to the gear travel on the tracks. That is, a probe tangent to the base circle and in contact with an involute gear tooth surface should show no displacement when the base circle disks coupled to the gear travel without slipping on the tracks. In this manner, selected parameters of the involute gear or pinion can be measured and/or verified.

The apparatus of the referenced U.S. Patent, while theoretically capable of operation with any gears of any size, becomes impractical for large gears. The disks which are coupled to the gear become heavier and more awkward as the size of the gear increases. Furthermore, the increase in size of the gears themselves make the handling of the gears more difficult.

A need has therefore been felt for apparatus for verifying the parameters of an involute gear that is relatively inexpensive to manufacture, is simple to operate, which can be easily transported to remote locations to perform the measurements in the vicinity of the machines using the involute gear, and which does not require substantial manipulation of the gear being tested.

FEATURES OF THE INVENTION

It is an object of the present invention to provide an improved apparatus and method for testing the parameters of gears.

It is a feature of the present invention to provide an improved apparatus and method for testing involute gears.

It is another further feature of the present invention to provide an improved apparatus and method for testing parameters of involute axle gears.

It is a still further feature of the present invention to provide apparatus and an associated method for the on site testing of involute gears.

It is yet a further feature of the present invention to provide portable apparatus and an associated method for verification of the surface of involute gears.

It is still a further feature of the present invention for providing portable apparatus and an associated method for verifying a block span parameter of an involute gear.

SUMMARY OF THE INVENTION

The aforementioned and other features are attained, according to the present invention, by providing an attachment mechanism which couples to the gear. The attachment mechanism, when coupled correctly to the gear, provides a surface at a distance of the base circle from the gear axis. A displacement measuring device has a flat surface which is positioned on the base circle radius surface. A probe, in the plane of the displacement measuring device surface, is placed in forcible contact with a gear tooth and the displacement measuring device rotated without sliding on the base circle surface. For an acceptable gear tooth surface, the displacement measured must be less than a predetermined amount. The apparatus, with an attachment, can be used to verify the block span parameters of the gear teeth. The apparatus is provided with structure to prevent relative motion of the displacement measuring device and base circle surface.

These and other features of the invention will be understood upon reading of the following description along with the drawings.

BRIEF DESCRIPTION OF THE DRAWINGS

FIG. 1A is a sector of an axle gear, while FIG. 1B is a cross-sectional view of an axle gear.

FIG. 2 illustrates the attachment mechanism which detachably couples to the axle gear and which provides a surface at a radius equal to the base circle radius of the gear.

DESCRIPTION OF THE PREFERRED EMBODIMENT

Figure 3:
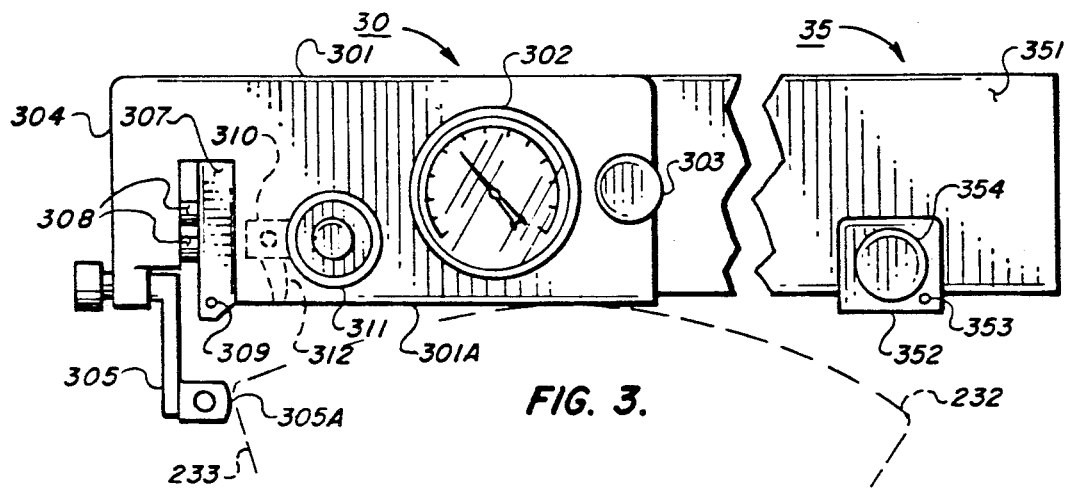
FIG. 3 is a view of the measuring device according to the present invention.

Detailed Description of the FIGS.

Referring now to FIG. 1A, a front view of a sector of a locomotive axle gear 10 is shown, while in FIG. 1B a cross-sectional view of the locomotive axle gear is shown. The dashed line 11 is the axis of the gear 10. Surface 12 is a surface of the axle bore hole, while surface 13 is the outer surface of the axle bore hole structure. In the fabrication of a locomotive axle gear, the outer surface 13 of the bore hole structure is fabricated precisely with respect to the axis 11, i.e., the distance B between the axis and the outer axle gear bore hole structure is determined within closely described limits. The column 16 extends from the axle gear bore hole structure 18 to the radial member 14 in which the gear teeth 15 are fabricated. The axle gear, in the region of the column and in the column itself has apertures formed in such a manner as to retain the strength of the gear while reducing its weight.

Referring to FIG. 2, the attachment mechanism is shown. The attachment mechanism includes three sections, a base section 21, an intermediate section 22, and a surface section 23. The base section 21 has a base extension 212 which extends from the base section body 211. When the attachment mechanism 20 is coupled to the gear 10, the edges of the 212A and 212B of the base extension contact the interior surface 12 of the axle bore hole structure. The intermediate section 22 is slidably coupled to base section 21. Intermediate section 22 includes a body 221 with a member 221A extending therefrom. When the attachment mechanism 20 is attached to gear 10, intermediate section 22 is forced toward base extension 212 and locked in place (by apparatus not shown). In the locked position, edges 212A and 212B engage the bottom surface 12 of the axle gear bore hole structure 18 while the member 221A engages the outer surface 13 of the bore hole structure. The portion of member 221A engaging the outer surface is positioned a distance B from the axis of the gear (i.e., because the surface 13 with which member 221A is in contact is a distance B from the axis). Surface section 23 is coupled to the intermediate section 22 and extends an adjustable distance (by apparatus not shown) from the axis of the gear. The body 231 of surface section 23 includes a surface 232 which is a section of a cylinder having a predetermined radius, the radius being equal to the gear base circle radius. By adjusting the distance of the surface section 23, the surface 232 is positioned to be a base circle radius distance from the gear axis. Because the distance B, the distance between the outer surface of the bore hole structure 18 and the axis is precisely known, then surface member 23 is adjusted so that when coupled, the distance C, the distance between the portion of the member 221A engaging the outer surface 13 of the bore hole structure and the surface 232 of surface member 23, when added to the distance B is equal to the gear base circle radius distance. For reasons to be discussed below, the end surfaces 233 of surface member are formed with a transposed involute surface configuration. The transposed involute configuration is typically referred to as a constant velocity spiral.

Referring to FIG. 3, a front view of the displacement measuring device 30 is shown. The displacement measuring device 30 includes a body 301 having a flat bottom surface 301A. A displacement gauge 302 and an adjustment knob 303 provide mechanism for actual displacement measurements. The displacement measured is that of post 307 and more specifically, probe 309 extending to the rear of displacement measuring device 30. The probe 309 is in the same plane as surface 301A. The guides 308 limit the motion of the probe 309 to be in the plane defined by surface 301A. The surface 301A, in the operative configuration, is positioned on surface 232 of the surface section 23 (surface 232 being shown by dashed lines in FIG. 3). Coupled to body 301 is member 304. Member 304 provide a structure to support guides 308 and for attaching projection member 305 thereto. During the operation of the present invention, the displacement measuring apparatus 30, positioned on surface 232 of the attachment mechanism, must rotate without displacement between surface 232 and surface 301A in the presence of the spring-loaded probe 309. In order to prevent relative displacement of the surfaces, the ends of the surface member 23 have planes fashioned on the ends that have a transposed involute configuration. When the projection member 305 has a region 305A in contact with the transposed involute surface 233, the displacement measuring device 30 can be rotated while positioned on the attachment member without displacement of surface 301A and 232. A projection member 35 can be coupled to the displacement measuring apparatus 30. The projection member body 351 has an attachment device 352 connected thereto for securing a second probe 353, the second probe extending behind the projection member body 351 in a plane defined to be the surface 301A of displacement measuring device body 301. The knob 354 permits the adjustment of attachment device 352 and, consequently, the probe 353. On the rear of the displacement measuring device 30 (and shown with dotted lines) is base pitch probe 312, the end of which will contact a tooth surface in the base circle tangent plane when in use, i.e., the end of base pitch probe 312 is in the same plane as the surface 301A of the displacement measuring device. The position of the base pitch probe can the adjusted by slidable member 310 (also shown by dotted lines) under the control of knob 311.

Figure 4:
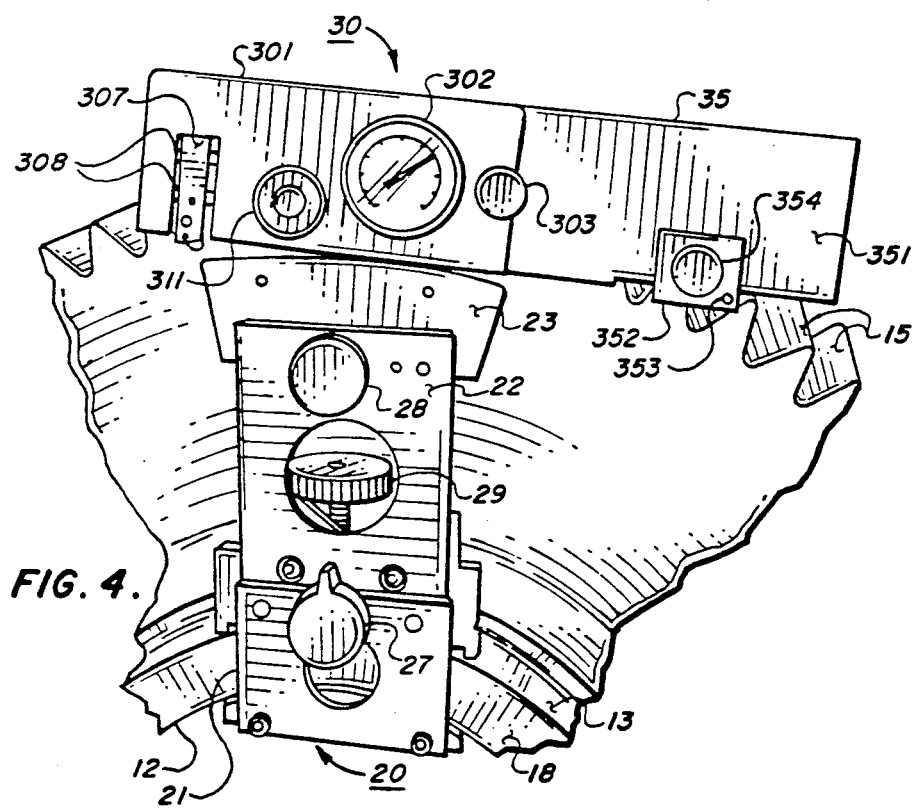
FIG. 4 is a front view of the apparatus of the present invention coupled to a gear.

Referring to FIG. 4, a front view of the measuring apparatus of the present invention when coupled to a gear is shown. The gear has teeth 15, a outer bore hole structure surface 13 and a inner bore hole structure surface 12. The displacement measuring device 30 includes the gauge 302, the gauge adjustment knob 303, the base pitch adjustment knob 311, post 307 with the probe coupled thereto, the projection member 35 and the projection member body 351. The attachment section 20 includes the base section 21, the intermediate section 22 and the surface section 23. The knob 28 secures, along with mounting posts, the surface section 23 to the intermediate section 22. The knob 29 forces the engagement of the base section 21 and the intermediate section 22 with the bore hole structure 18. The knob 27 assists securing the attachment member to the gear.

Figure 5:
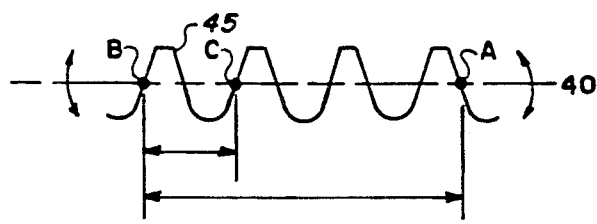
FIG. 5 illustrates the parameters which can be measured by the present invention.

Referring to FIG. 5, parameters verified by the present invention are illustrated. Plane 40 is defined by the surface 301A of the displacement measuring device, while profile 45 illustrates the gear tooth profile. As the plane 40 is rotated according to the present invention, point A will exhibit displacement only within predetermined limits when the tooth profile is acceptable. For the block span verification, the distance between two tooth surfaces separated by at least one other gear tooth, designated by the distance between points A and C in FIG. 5, should vary only with predetermined limits for an acceptable gear. The block span is tested by post 307 (by mans of probe 309) and probe 353. The distance between two adjacent gear tooth surfaces, designated by points C, in FIG. 5, is the base pitch. The base pitch is tested by probe 309 and base pitch probe 312.

Operation of the Preferred Embodiment

The operation of the present invention can be understood in the following manner. As described in detail in U.S. Pat. No. 4,962,590, when an involute gear of pinion is rotated without slipping on a track tangent to the base circle of the gear or pinion, a fixed probe in contact with the surface of a gear tooth and located tangent to the base circle will not be displaced during the gear rotation. The surface of the tracks is analogous, in the present invention, to the surface 301A of the displacement measuring device. Because the displacement measuring device is positioned on a surface that is an extension of the gear base circle, the surface 301A defines a tangent line of the base circle. Because the probe 309 (and the probe 353) are located in a plane tangent to the base circle, when the displacement measuring device is rotated while in contact with the base circle surface provided by the attachment mechanism (without slipping), then a probe 309 in contact with a working surface of a tooth of an involute gear will be displaced within predetermined limits for an acceptable gear. The probe is spring loaded against the gear tooth and any displacement of the probe 309 will result in a displacement in post 307. The displacement in post 307 will be reflected in the reading of gauge 302. For convenient reading of the gauge, the adjustment knob 303 can initialize the gauge reading. Thus, unacceptable manufacture or wear for a gear tooth surface can be identified using the present apparatus.

The distance between the probe 309 and the base pitch probe 312 is the base pitch of the gear. The position of base pitch probe 312 is adjusted to permit probe 309 to be displaced in either direction when the two probes are in contact with the two tooth surfaces. When the distance between probes is calibrated, the actual base pitch of the gear can be measured. When the distance between probes is not calibrated, the consistency of the base pitch measurement can be verified for the gear. In addition, the distance between the probe and the base pitch probe should be constant for rotation of the displacement measuring device.

With the attachment 35 in place, the block span of the tooth surfaces of an involute gear can be verified. In this measurement, the two probes are placed in contact with the same gear tooth surface of different gear teeth. The probe 353 is adjusted so that the probe 309 can be displaced in either direction when the two probes are in contact with tooth surfaces. The displacement measuring device is rotated, as long as the probes contact working surfaces, no displacement should be observed. Similarly, the apparatus of the invention can be used to measure the concentricity and the base pitch of the gear.

As will be clear, the surface member 23 can be prepared for each base circle radius and coupled to the attachment mechanism when appropriate. The critical adjustment is the relationship of the region of the member 221A engaging the top of the axle bore hole and the base circle surface.

The bore hole structure of the locomotive axle gear provides a convenient way to couple to the gear, particularly in view of the precise distance of the outer surface of the bore hole structure with respect to the gear axis. It will be clear, however, that any attachment mechanism that provides a surface at a distance of the base circle radius when coupled to the involute gear can be used.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. Apparatus for measuring parameters of an involute gear, said apparatus comprising:
    a coupling apparatus for coupling to said gear, said coupling apparatus providing a base circle surface parallel to a gear axis at a distance of a base circle radius from said gear axis, wherein said coupling apparatus includes a surface having a transposed involute configuration; and
    a measuring block including a flat surface, said flat surface rotating non-slidably on said base circle surface, said measuring block including a probe extending from said measuring block for engaging a gear tooth surface at a point in a plane defined by said flat surface, said measuring block including a displacement gauge to measure a displacement of said probe during rotation of said flat surface, said measuring block including a contact member for engaging said transposed involute surface, said measuring block flat surface rotating on said base circle without slipping when said contact member is in contact with said transposed involute surface.

2. The apparatus of claim 1 wherein said involute gear is an axle gear having a bore hole structure, said coupling apparatus includes gripping apparatus for engaging a top and a bottom surface of said bore hole structure.

3. The apparatus of claim 2 wherein at least one of said bore hole surfaces designates a distance from an axis of said gear.

4. The apparatus of claim 3 further including extension apparatus for positioning a second probe in a plane defined by said measuring block flat surface, said second probe positioned to contact a second gear tooth surface when said probe contacts a first gear tooth surface.

5. The apparatus of claim 1 wherein said probe has a constant force applied thereto to maintain said probe in contact with a gear tooth surface during rotation of said measuring block fat surface relative to said base circle surface.

6. The apparatus of claim 1 wherein said coupling member includes a detachable surface member, said surface member having said base circle surface formed thereon, said detachable member including a locking means for adjustably positioning said detachable surface member relative to said coupling member.

7. A method of measuring parameters of gear teeth of an involute gear, said method comprising the steps of:
attaching a surface member to said gear, said surface member having a cylindrical surface sector, said cylindrical surface sector defined by a radius equal to a base circle radius of said gear, said surface member being attached to said gear to locate said cylindrical surface sector at a distance equal to said base circle radius from an axis of said gear;
determining a tangent plane tangent to a base circle of said gear by positioning a body having a flat surface on said cylindrical surface sector, said flat surface being a part of said tangent plane;
positioning a probe in said tangent plane against a gear tooth surface;
providing said cylindrical surface sector with a transposed involute surface;
rotating said body while an extension member of said body is in contact with said transposed involute surface during said rotating said body, said contact resulting in non-slidable contact between said body and said cylindrical surface sector; and
measuring a displacement of said probe during said rotating said body.

8. The method of claim 7 wherein said gear is an axle gear having bore hole structure located symmetrically about an axis of said gear, wherein said attaching step includes the step of coupling said cylindrical sector surface to said bore hole structure.

9. The method of claim 7 wherein a second probe is positioned in said tangent plane against a second tooth surface, said rotating step including the step of rotating said body while in contact with said cylindrical surface sector, and wherein said measuring step includes the step of measuring a change in distance between said probe and said second probe.

10. Apparatus for measuring parameters of gear teeth for an involute gear, said apparatus comprising:
an attachment mechanism including a coupling mechanism for coupling to said gear, said attachment mechanism including a sector of a cylinder, said cylinder having a radius of a base circle of said gear and having an axis coincident with an axis of said gear, wherein said attachment mechanism includes a transposed involute surface; and
a measuring device, said measuring device including a flat surface for contacting said cylinder sector, said measuring device including a probe for being forced contact with a gear tooth surface, said probe being in a plane defined by said flat surface, wherein said measuring device includes a gauge for measuring a displacement of said probe during rotation of said measuring device while said flat surface is in contact with said sector, said measuring device includes an extension member, wherein said flat surface does not slide on said sector when said extension member is in contact with said transposed involute surface during rotation of said measuring device.

11. The apparatus of claim 10 further comprising:
an auxiliary member detachably coupled to said measuring device, said auxiliary member positioning a second probe against a second gear tooth surface, said second probe being positioned in said tangent plane.

12. The apparatus of claim 11 wherein said gauge measures a change is distance between said probe and said second probe during rotation of said measuring device.

13. The apparatus of claim 10 wherein said involute gear is an axle gear.

14. The apparatus of claim 13 wherein said attachment mechanism is coupled to a bore hole structure of said axle gear.

15. The apparatus of claim 14 wherein said bore hole structure has an outer surface a predetermined distance from an axis of said gear.

16. The apparatus of claim 10 wherein said measuring device includes:
a base pitch probe having an adjustable position, said base pitch probe contacting a second gear tooth surface in said tangent plane, a distance between said probe and said base pitch probe being a base pitch of said gear.

* * * * *